United States Patent [19]

Hohmann et al.

[11] Patent Number: 4,981,555

[45] Date of Patent: Jan. 1, 1991

[54] PROCESS AND APPARATUS FOR CONCENTRATING A SOLUTION

[75] Inventors: Klaus Hohmann, Hofheim; Manfred Mai, Frankfurt am Main, both of Fed. Rep. of Germany

[73] Assignee: Metallgesellschaft AG, Frankfurt am Main, Fed. Rep. of Germany

[21] Appl. No.: 410,636

[22] Filed: Sep. 21, 1989

[30] Foreign Application Priority Data

Oct. 12, 1988 [DE] Fed. Rep. of Germany ....... 3834716

[51] Int. Cl.$^5$ .......................... B01D 1/22; B01D 1/26
[52] U.S. Cl. .................................. 159/13.2; 159/17.2; 159/17.3; 159/23; 159/43.1; 159/49; 159/901; 159/DIG. 8; 159/DIG. 32; 202/174; 202/235; 202/236
[58] Field of Search .................... 159/13.2, 17.3, 23, 159/43.1, 17.2, 4.9, DIG. 32, DIG. 8, 901; 202/174, 236, 235; 203/89, 25, 27, 72, 89, DIG. 8, DIG. 9, 79, 96; 162/30.11

[56] References Cited

U.S. PATENT DOCUMENTS

| | | | |
|---|---|---|---|
| 3,303,106 | 2/1967 | Standiford, Jr. | 159/13.2 |
| 3,332,470 | 7/1967 | Chirico et al. | 159/DIG. 25 |
| 3,351,120 | 1/1967 | Goeldner et al. | 202/174 |
| 3,405,689 | 10/1968 | Petersen | 159/13.2 |
| 3,672,960 | 6/1972 | Kays | 202/174 |
| 3,797,552 | 3/1974 | Frank et al. | 202/174 |
| 3,807,479 | 4/1974 | Brannland et al. | 202/174 |
| 3,875,988 | 4/1975 | Machida et al. | 159/13.2 |
| 3,901,768 | 8/1975 | Steinbruchel | 202/174 |
| 3,968,002 | 7/1976 | Standiford | 159/13.2 |
| 4,364,794 | 12/1982 | Lankenau | 159/17.2 |
| 4,366,027 | 12/1982 | Lauro | 202/174 |
| 4,533,433 | 8/1985 | Petterson | 159/47.3 |
| 4,687,546 | 8/1987 | Willis | 202/174 |

FOREIGN PATENT DOCUMENTS

11102702 3/1961 Fed. Rep. of Germany .

*Primary Examiner*—Virginia Manoharan
*Attorney, Agent, or Firm*—Herbert Dubno

[57] ABSTRACT

The solutions are concentrated by multiple-effect evaporation in indirectly heated evaporators. The highest concentration of the solution is reached in a final evaporator stage, which is heated with live steam. The final evaporators stage includes two to four falling-film evaporators, all of which are heated with live steam. The falling-film evaporators are consecutively flown through by the solution. Vapor is withdrawn from that falling-film evaporator which is the first to be supplied with the solution and at least part of said vapor is directly contacted with the solution as it flows down through the heating zone of at least one other evaporator of the final stage. From that falling-film evaporator of the final stage which is the first to be supplied with the solution the vapor may be fed to all other evaporators of the final stage.

4 Claims, 1 Drawing Sheet

PROCESS AND APPARATUS FOR CONCENTRATING A SOLUTION

FIELD OF THE INVENTION

Our present invention relates to a process for concentrating solutions by a multiple-effect evaporation in indirectly heated evaporators, wherein the solution is concentrated in part by means of vapor used as a heating fluid and the highest concentration of the solution is reached in a succeeding final evaporator stage, which is heated with live steam.

The invention also relates to an apparatus or plant for carrying out the process of the invention.

The process and the plant can be used to treat various kinds of solutions, e.g. to concentrate black liquor in the production of pulp.

BACKGROUND OF THE INVENTION

Multiple-effect evaporation systems are, of course, known for the concentration of solutions including black liquor as produced in the production of paper pulp. By and large, however, the operation of such systems is not economical. Costs are high because forced circulation evaporators are normally employed in; the known process and apparatus system.

Furthermore, incrustation of the pathways of the plant is common. This means that maintenance costs are high and shut down of the plant may be required to allow incrustation to be removed.

OBJECTS OF THE INVENTION

It is an object of the invention to achieve a high final concentration in a manner which is as economical as possible and to avoid a disturbing incrustation. A further object of this invention is to provide an improved process for concentrating solutions and especially the black liquor product in the production of pulp, whereby drawbacks of earlier processes are avoided.

Still another object of this invention is to provide an improved apparatus or plant for carrying out the improved process and in which incrustation formation is reduced and plant economy increased.

SUMMARY OF THE INVENTION

This is accomplished in accordance with the invention in that the final evaporator stage consists of two to four falling-film evaporators, which are indirectly heated with live steam and are consecutively flown through by the solution, vapor is withdrawn from that falling-film evaporator of the final stage which is the first to be supplied with the solution and at least part of said vapor which has been withdrawn is directly contacted with the solution as it flows down through the heating zone of at least one of the other falling-film evaporators of the final stage.

More specifically, in its process aspect, the invention provides a process which comprises the steps of:

(a) subjecting the solution to a multiple-effect evaporation in a plurality of indirectly heated evaporation stages upstream of a final evaporation stage to partially concentrate the solution in each of the indirectly heated evaporation stages to a highest partial concentration immediately upstream of the final evaporation stage and with the use at least in part of vapor produced by evaporation as a heating medium in the plurality of indirectly heated evaporation stages;

(b) passing the partially concentrated solution at the highest partial concentration to the final evaporation stage and constituting the final evaporation stage only of a plurality of falling-film evaporators which are successively traversed by the solution, while indirectly heating the solution in the final evaporation stage with live steam; and (c) withdrawing vapor from a first of the falling-film evaporators to be supplied with the solution and directly contacting the solution of at least one other of the falling-film evaporators with the withdrawn vapor so that the vapor and the solution in contact therewith pass downwardly in the other of the falling-film evaporators.

The means for withdrawing vapor from the first of the falling-film evaporators includes a connecting line provided between the first of these evaporators and at least one and preferably all of the other falling-film evaporators. Between the outlet end of the line and the heating zone of the falling-film evaporator into which this line opens, a permeable distributor plate is provided.

Only falling film evaporators are used in the final stage. The more expensive forced-circulation evaporators which are usually employed are not required. In the falling-film evaporator of the final stage, the vapor which is supplied imparts to the downflowing film of liquid a high turbulence so that the heat transfer is improved. The vapor also opposes the formation of deposits and crusts so that the evaporators may be operated for a longer time. Without difficulty, the supply and discharge lines connected to the evaporators of the final stage may be so designed that the solution can be supplied first to each of the falling-film evaporators in alternation by a simple changeover. A special advantage afforded by the process resides in that only vapor streams having the same temperature are used in the final stage.

If the final evaporator stage consists of three or four falling-film evaporators, the vapor from that evaporator which is the first to be supplied with the solution may be distributed to all other evaporators of the final stage.

That falling-film evaporator of the final stage which is the first to be supplied with the solution is preferably operated under a somewhat higher pressure than the other falling-film evaporators of the final stage. In that case no fan will be required to feed the vapor from the one evaporator to the other evaporator or evaporators and a differential pressure in the range from 5 to 300 millibars between the evaporators will be recommendable. In practice, the higher pressure in the one falling-film evaporator will automatically be obtained if the exit for vapor to be supplied to the other evaporators is sufficiently throttled.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
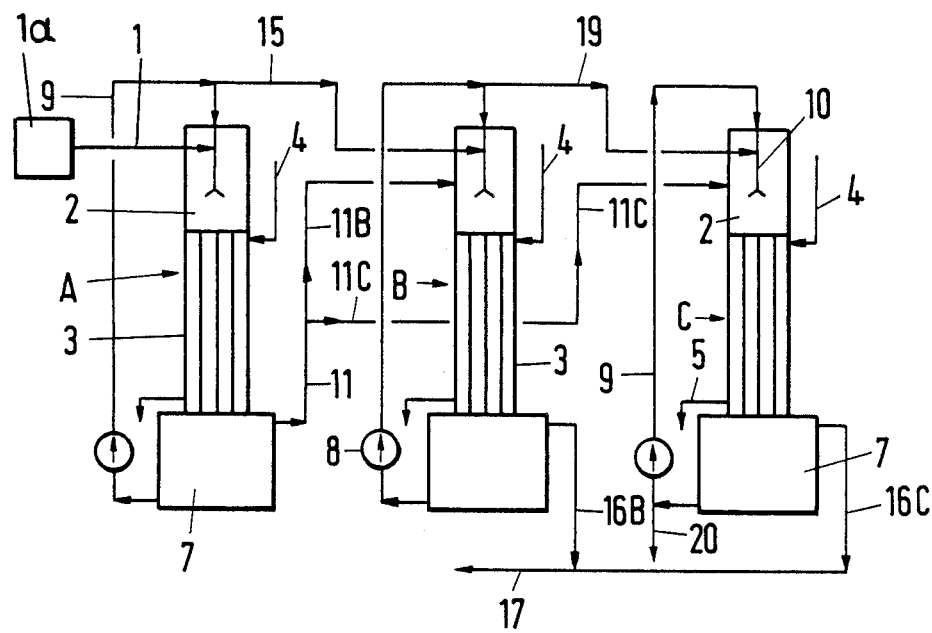
FIG. 1 is a flow-diagram showing the final evaporator stage.

A solution which has been concentrated in part in a portion of the evaporating apparatus which is shown is 1a (merely for diagrammatic purpose) is supplied in line 1 to the evaporator A of the final evaporator stage (FIG. 1).

Figure 2:
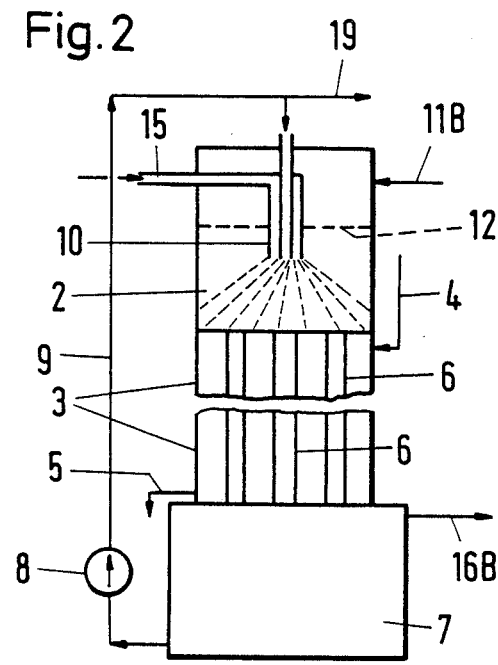
FIG. 2 shows a falling-film evaporator of the final stage with a line for applying vapor.

The final stage consists of the falling-film evaporators A, B and C, which are generally alike and the essential details of which are apparent from FIG. 2.

Each evaporator comprises an upper entrance space 2 and a heating zone 3 provided with a supply line 4 for live steam and a discharge line 5 for condensate. The live steam serves to indirectly heat the solution, which flows down from top to bottom in tubes 6 (FIG. 2) along the inside surfaces thereof to a steaming-out tank 7.

Vapor is withdrawn in line 11. Instead of the tubes 6, the evaporators may be provided in known manner with defined chambers, e.g., by vertical plates.

Part of the solution is recirculated by the pump 8 through the line 9. Solution coming from another evaporator and the recirculated solution are jointly passed through a spray head 10 and are sprayed downwardly. If vapor from a different evaporator is also supplied to the entrance space 2 (see line 11B in FIG. 2), a distributor plate 12 may be provided in the space 2 between the outlet of the line 11B and the outlet of the spray head 10.

The plate 12 is perforated or sieve-like to ensure that the vapor is distributed to the inlets of the tubes 6 as uniformly as possible. But the plate 12 is not essential.

The final evaporator stage shown in FIG. 1 has the following mode of operation. The partly concentrated solution which is supplied in line 1 and the recirculated solution are jointly sprayed in the entrance space 2 of the evaporator A and are passed downwardly through the associated heating zone 3.

Concentrated solution is branched off in line 15 and is supplied to the evaporator 3. The vapor which has been formed in the evaporator A is under a pressure which is somewhat higher than the pressure in the entrance spaces of the evaporators B and C. Said vapor is supplied in part in line 11B to the evaporator B and in part in line 11C to the evaporator C.

The vapors which are generated in the evaporators B and C are withdrawn in lines 16B and 16C and in the manifold 17 are supplied to the other part, not shown, of the evaporating plant and used to heat said part. Part of the recirculated solution from the evaporator B is branched in line 19 and is supplied to the evaporator C, in which the final concentration is reached. Highly concentrated solution is withdrawn from the evaporating plant in line 20.

SPECIFIC EXAMPLE

A final evaporator stage as shown in the drawing, comprising three falling-film evaporators, is supplied in line 1 with black liquor having a solids content of 45% and coming from preceding evaporators. The black liquor containing 55% solids is supplied in line 15 to the evaporator B. A liquor containing 67% solids is supplied in line 19 to the evaporator C. The final concentration of the liquor in line 20 corresponds to a solids content of 75%. For that purpose live steam at 145° C. is supplied in line 4 to the evaporators and vapor at a saturated-steam temperature of 116° C. is withdrawn in line 11.

The vapor in lines 16B and 16C has a saturated-steam temperature of 115° C. The difference between the temperatures of the vapor in the evaporator A and in the evaporators B and C will automatically be obtained in dependence on the pressure losses in lines 11, 11B and 11C. The pressure in the evaporator A is higher by 60 millibars than the pressure in the evaporators B and C.

We claim:
1. A process for concentrating a solution which comprises the steps of:
   (a) subjecting said solution to a multiple-effect evaporation in a plurality of indirectly heated evaporation stages upstream of a final evaporation stage to partially concentrate the solution in each of said indirectly heated evaporation stages to a highest partial concentration immediately upstream of said final evaporation stage and with the use at least in part of vapor produced by evaporation as a heating medium in said plurality of indirectly heated evaporation stages;
   (b) passing the partially concentrated solution at said highest partial concentration together with a recirculated solution to said final evaporation stage and constituting said final evaporation stage only of two to four falling-film evaporators which are successively traversed jointly by said partially concentrated solution and the recirculated solution, while indirectly heating said solutions in all said falling-film evaporators with live steam; and
   (c) withdrawing vapor from a first of said falling-film evaporators and directly contacting said solution in each of the others of said falling-film evaporators with at least part of the withdrawn vapor so that the vapor and the solutions in contact therewith pass downwardly in each of said others of said falling-film evaporators.

2. The process defined in claim 1, further comprising the step of operating said first of said falling-film evaporators at a higher pressure than said other of said falling-film evaporators.

3. An apparatus for concentrating a solution which comprises:
   means for subjecting said solution to a multiple-effect evaporation in a plurality of indirectly heated evaporation stages upstream of a final evaporation stage to partially concentrate the solution in each of said indirectly heated evaporation stages to a highest partial concentration immediately upstream of said final evaporation stage and with the use at least in part of vapor produced by evaporation as a heating medium in said plurality of indirectly heated evaporation stages;
   a plurality of falling-film evaporators constituting said final evaporation stage, connected to be traversed in succession by the solution and connected to a last of said indirectly heated stages for receiving the partially concentrated solution at said highest partial concentration, said falling-film evaporators being provided with means for indirectly heating said solution in all said falling-film evaporators with live steam said final evaporation stage consists of 2 to 4 falling-film evaporators; and
   means for withdrawing vapor from a first of said falling-film evaporators and directly contacting said solution in each of the others of said falling-film evaporators with at least part of the withdrawn vapor so that the vapor and the solution in contact therewith pass downwardly in said each of the others of said falling-film evaporators, said means for withdrawing vapor from a first of said falling-film evaporators includes connecting lines for vapor provided between said first of said falling-film evaporators and at each of the others of said falling-film evaporators.

4. The apparatus defined in claim 3 wherein said each of the others of said falling-film evaporators is provided with a distributor plate, said plate being sieve-like.

* * * * *